(12) United States Patent
Wang et al.

(10) Patent No.: US 11,595,080 B2
(45) Date of Patent: Feb. 28, 2023

(54) NETWORK DISTRIBUTION METHOD AND APPARATUS, AND ELECTRONIC DEVICE

(71) Applicant: BEIJING XIAOMI MOBILE SOFTWARE CO., LTD., Beijing (CN)

(72) Inventors: Peng Wang, Beijing (CN); Xiangda Hu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 105 days.

(21) Appl. No.: 16/892,064

(22) Filed: Jun. 3, 2020

(65) Prior Publication Data
US 2021/0184727 A1 Jun. 17, 2021

(30) Foreign Application Priority Data
Dec. 16, 2019 (CN) .......................... 201911295972.7

(51) Int. Cl.
*H04B 3/42* (2006.01)
*H04B 3/54* (2006.01)
(Continued)

(52) U.S. Cl.
CPC ............... *H04B 3/542* (2013.01); *H04B 3/58* (2013.01); *H04W 84/12* (2013.01)

(58) Field of Classification Search
CPC .. H04B 3/542; H04B 3/58; H04B 2203/5441; H04B 3/54; H04W 84/12; H04W 48/08; H04W 48/10
See application file for complete search history.

(56) References Cited

U.S. PATENT DOCUMENTS

2006/0018328 A1* 1/2006 Mody ................ H04B 3/542
370/401
2007/0271398 A1 11/2007 Manchester et al.
(Continued)

FOREIGN PATENT DOCUMENTS

CN 104865943 A 8/2015
CN 107171905 A 9/2017
(Continued)

OTHER PUBLICATIONS

Extended European Search Report in Application No. 20181993.5, dated Jul. 27, 2020.
(Continued)

*Primary Examiner* — Steven H Nguyen
(74) *Attorney, Agent, or Firm* — Syncoda LLC; Feng Ma (57) ABSTRACT

A network distribution method applied to a Power Line Communication (PLC) sub-device includes: acquiring Wi-Fi configuration information from a PLC parent device through a power line in response to the PLC sub-device to be distributed accessing the power line; and performing Wi-Fi configuration on the PLC sub-device based on the configuration information. By connecting the power line, the PLC parent device sends the Wi-Fi configuration information to the PLC sub-device to be distributed, and the PLC sub-device performs network distribution based on the Wi-Fi configuration information and the router, thereby simplifying the network distribution process of the smart devices, the user only needs to electrically connect the PLC sub-device to be distributed to the power line through the socket to implement the network distribution process.

13 Claims, 4 Drawing Sheets

(51) Int. Cl.
   *H04B 3/58*      (2006.01)
   *H04W 84/12*     (2009.01)

(56) References Cited

U.S. PATENT DOCUMENTS

| | | | | |
|---|---|---|---|---|
| 2011/0317603 A1* | 12/2011 | Ruiz Lopez | ............. | H04B 3/54 370/311 |
| 2012/0044856 A1* | 2/2012 | Huang | ................ | H04L 41/0809 370/315 |
| 2012/0044863 A1* | 2/2012 | Huang | ................. | H04W 84/12 370/328 |
| 2019/0349366 A1* | 11/2019 | Dewan | ................. | H04W 76/10 |

FOREIGN PATENT DOCUMENTS

| | | |
|---|---|---|
| CN | 109962844 A | 7/2019 |
| EP | 3553957 A1 | 10/2019 |

OTHER PUBLICATIONS

First Office Action in Application No. CN 201911295972.7 dated Jun. 29, 2021.
CN Second Office Action in Application No. 201911295972.7, dated Dec. 16, 2021.

\* cited by examiner

NETWORK DISTRIBUTION METHOD AND APPARATUS, AND ELECTRONIC DEVICE

CROSS-REFERENCE TO RELATED APPLICATION

This application claims priority to Chinese Patent Application 201911295972.7 filed on Dec. 16, 2019, the disclosure of which is hereby incorporated by reference in its entirety.

BACKGROUND

With the rapid development of smart homes, there are more and more smart devices in users' homes, such as floor cleaning robots, smart speakers, and smart sockets. These smart devices can be connected to the Internet via an access router.

SUMMARY

The present disclosure generally relates to the field of wireless communication technology, and more specifically, to a network distribution method, a network distribution apparatus and an electronic device, and a computer-readable storage medium.

According to a first aspect of embodiments of the present disclosure, there is provided a network distribution method applied to a Power Line Communication (PLC) sub-device, and the method includes: acquiring Wi-Fi configuration information from a PLC parent device through a power line in response to the PLC sub-device to be distributed accessing the power line; and performing Wi-Fi configuration on the PLC sub-device based on the configuration information.

In some embodiments, the acquiring Wi-Fi configuration information from a PLC parent device through a power line in response to the PLC sub-device to be distributed accessing the power line includes: determining the PLC parent device in a power circuit where the PLC sub-device is located in response to the PLC sub-device to be distributed accessing a power line; sending a Wi-Fi configuration information acquisition request to the PLC parent device; and receiving Wi-Fi configuration information returned by the PLC parent device; or receiving broadcast information sent from a PLC parent device in a power circuit where the PLC sub-device is located in response to the PLC sub-device to be distributed accessing a power line; and acquiring Wi-Fi configuration information included in the broadcast information.

In some embodiments, the method further includes: connecting to an external network by using the PLC parent device as a bridge through the power line.

In some embodiments, the method further includes: sending status change information to the PLC parent device; and/or receiving a control instruction issued by the PLC parent device through the power line, and performing an operation corresponding to the control instruction.

According to a second aspect of embodiments of the present disclosure, there is provided another network distribution method applied to a PLC parent device, the method includes: setting in advance Wi-Fi configuration information; and providing the Wi-Fi configuration information to a PLC sub-device through a power line in response to the PLC sub-device to be distributed accessing the power line, to make the PLC sub-device to be distributed to perform network distribution based on the Wi-Fi configuration information.

In some embodiments, the method further includes: connecting the PLC sub-device with an external network by using the PLC parent device as a bridge through the power line, to make the PLC sub-device connected to an external network through the PLC parent device.

In some embodiments, the method further includes: storing in advance control logic information between at least two PLC sub-devices; determining a second PLC sub-device and a control instruction that triggers a second default behavior of the second PLC sub-device based on the control logic information in response to a first default behavior occurring in a first PLC sub-device; and sending the control instruction to the second PLC sub-device through the power line to trigger the second PLC sub-device to perform the second default behavior.

In some embodiments, the PLC parent device is a router device provided with a PLC chip.

According to a third aspect of embodiments of the present disclosure, there is provided a network distribution apparatus applied to a PLC sub-device, the apparatus includes: an electrical connecting component configured to acquire Wi-Fi configuration information from a PLC parent device through a power line in response to the PLC sub-device to be distributed accessing the power line; and a wireless connecting component configured to perform Wi-Fi configuration on the PLC sub-device based on the configuration information.

In some embodiments, the electrical connecting component is configured to: determine a PLC parent device in a power circuit where the PLC sub-device is located in response to the PLC sub-device to be distributed accessing a power line; send a Wi-Fi configuration information acquisition request to the PLC parent device; and receive Wi-Fi configuration information returned by the PLC parent device; or receive broadcast information sent from a PLC parent device in a power circuit where the PLC sub-device is located in response to the PLC sub-device to be distributed accessing a power line; and acquire Wi-Fi configuration information included in the broadcast information.

In some embodiments, the electrical connecting component is further configured to: connect to an external network by using the PLC parent device as a bridge through the power line.

In some embodiments, the apparatus further includes: a sending component configured to send status change information to the PLC parent device; and/or a receiving and processing component configured to receive a control instruction issued by the PLC parent device through the power line, and perform an operation corresponding to the control instruction.

According to a fourth aspect of embodiments of the present disclosure, there is provided another network distribution apparatus applied to a PLC parent device, the apparatus includes: a configuring component configured to set in advance Wi-Fi configuration information; and an electrical connecting network distribution component configured to provide the Wi-Fi configuration information to a PLC sub-device to be distributed through a power line, in response to the PLC sub-device to be distributed accessing the power line, to make the PLC sub-device to be distributed to perform network distribution based on the Wi-Fi configuration information.

In some embodiments, the electrical connecting network distribution component is further configured to: connect the PLC sub-device with an external network by using the PLC parent device as a bridge through the power line, to make the PLC sub-device connected to the external network through the PLC parent device.

In some embodiments, the apparatus further includes: a storing component configured to store in advance control logic information between at least two PLC sub-devices; and a processing component configured to determine a second PLC sub-device and a control instruction that triggers a second default behavior of the second PLC sub-device based on the control logic information in response to a first default behavior occurring in a first PLC sub-device; and the electrical connecting network distribution component being further configured to send the control instruction to the second PLC sub-device through the power line to trigger the second PLC sub-device to perform the second default behavior.

In some embodiments, the PLC parent device is a router device provided with a PLC chip.

According to a fifth aspect of embodiments of the present disclosure, there is provided an electronic device including: memory storing instructions; and a processor configured to invoke instructions stored in the memory to execute the network distribution method according to the first aspect or the second aspect.

According to a sixth aspect of embodiments of the present disclosure, there is provided a computer-readable storage medium that stores instructions, and when the instructions are executed by a processor, the network distribution method according to the first aspect or the second aspect is executed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Description will now be made in detail to embodiments, examples of which are illustrated in the accompanying drawings. The following description refers to the accompanying drawings in which the same numbers in different drawings represent the same or similar elements unless otherwise indicated. The implementations set forth in the following description of embodiments do not represent all implementations consistent with the present disclosure. Instead, they are merely examples of apparatuses and methods consistent with aspects related to the present disclosure as recited in the appended claims.

With the increase of the number of smart devices, it may be needed to make network distribution for each smart device, and the network distribution process is very cumbersome. Typically, only one device can be made the network distribution at a time. That is, a cumbersome network distribution process needs to be performed for each smart device. If the user is unfamiliar with the network distribution method, it takes time and efforts; and even if the user is familiar with the network distribution method, the network distributing operation also needs to be repeated.

In some technologies, when distributing network for a device to be distributed, it is generally necessary to power on these devices, and then activate them by physical buttons to allow the devices to transmit AP hotspots, and then use the mobile phone to open the corresponding APP and enable the mobile phone to connect to the hotspots from the APP. After connecting, Wi-Fi information is input in the mobile phone and then is transmitted to the device, and the device connects to the router according to the Wi-Fi information to distribute the network. The method is cumbersome to operate, the user needs to make corresponding input on the APP of the mobile phone, the process is long, and it takes time and effort for many new users if they are not familiar with the operation; even if they are familiar with the process, the operation steps cannot be omitted. And because using the mobile phone to connect to the hotspots is a basis, at present, most single phones can only be connected to one hotspot at the same time, thus only one device can be connected at a time to perform network distributing operation, and a complete operation process is required every time a device is connected to the network.

Therefore, various embodiments of the present disclosure provide a network distribution method. Specifically, FIG. 1 shows a schematic flowchart of a PLC-based network distribution method according to some embodiments.

Figure 1:
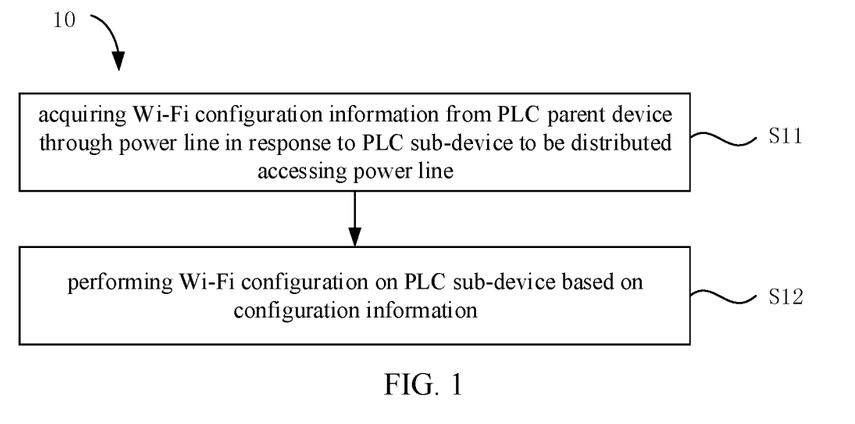
FIG. 1 is a schematic flowchart of a PLC-based network distribution method according to some embodiments.

As shown in FIG. 1, the network distribution method 10 is applied to a PLC sub-device, herein the PLC sub-device of the present disclosure can be a smart device with a Power Line Communication (PLC) module, which can be connected to a power line and needs to be connected to a network through a router, such as a smart speaker, a smart sweeper, a smart air purifier, a smart bulb, and the like. The PLC module can convert the carrier signal and digital signal transmitted by the power line when the PLC sub-device is connected to the power line. The network distribution method 10 includes a step S11 and a step S12:

In step S11, Wi-Fi configuration information is acquired from a PLC parent device through a power line, in response to the PLC sub-device to be distributed accessing the power line.

The PLC sub-device to which a network is not distributed, such as a new smart device purchased by a user, can be connected to the power line through a socket to form a closed circuit, and at this time, the Wi-Fi configuration information can be acquired from the PLC parent device through the power line in the form of a carrier signal through the PLC module of the PLC sub-device. Herein, the Wi-Fi configuration information is information used for network distribution, and can include a user name (ID) and a password of the Wi-Fi.

In some embodiments, step S11 can include: determining a PLC parent device in a power circuit where the PLC sub-device is located in response to the PLC sub-device to be distributed accessing a power line; sending a Wi-Fi configuration information acquisition request to the PLC parent device; and receiving Wi-Fi configuration information returned by the PLC parent device. After the PLC sub-device to be distributed accesses the power line, the PLC parent device is determined by broadcast or address through the carrier signal, and then a Wi-Fi configuration information acquisition request is sent to the PLC parent device, the PLC parent device also sends the Wi-Fi configuration information through the power line in response to the request, herein the PLC parent device is a device that has Wi-Fi information and also includes a PLC module, and the PLC parent device can be a router or other central device capable of spreading the Wi-Fi information to the power line.

In some other embodiments, the step S11 can also include: receiving broadcast information sent by a PLC parent device in a power circuit where the PLC sub-device is located, in response to the PLC sub-device to be distributed accessing a power line; and acquiring Wi-Fi configuration information included in the broadcast information. After the PLC sub-device to be distributed accesses the power line, the broadcast information sent by the PLC parent device is received through the power line to obtain the Wi-Fi configuration information.

In step S12, Wi-Fi configuration is performed on the PLC sub-device based on the configuration information.

After the Wi-Fi configuration information is received by a PLC module of the PLC sub-device through the power line in the form of a carrier signal, it can be converted into Wi-Fi configuration information in the form of a digital signal, and the obtained digital signal can be transmitted to a Wi-Fi module by means of a processor chip, serial peripheral interface (SPI) or universal asynchronous receiver/transmitter (UART), etc., the Wi-Fi module performs Wi-Fi configuration according to the Wi-Fi configuration information to implement network distribution, that is, the network can be connected through the router. According to the above embodiments, the PLC sub-device can perform network distribution conveniently, the user only needs to connect the smart device with the PLC module to the power line, the PLC sub-device to which a network is not distributed can automatically complete the network distribution through the power line and the PLC parent device in the power circuit, without cumbersome procedures, and the network distribution process is convenient, reliable and efficient.

In some embodiments, the network distribution method 10 can further include: connecting to an external network by using the PLC parent device as a bridge, through the power line.

In these embodiments, the PLC sub-device can send a notification of completion of the network distribution to the PLC parent device after completing the network distribution, in a case that the PLC sub-device is connected to the power line, the PLC sub-device and the PLC parent device can communicate with each other through the power line, and in these embodiments, the PLC parent device can assist the PLC sub-device to connect to the external network as a bridge device. Specifically, if the PLC parent device is a router, the PLC sub-device is connected to the router through the power line to implement connection to the external network; if the PLC parent device is not a router, the PLC sub-device is indirectly connected to the router through the power line and the PLC parent device to implement the connection to the external network. In this way, the PLC sub-device is connected to the network more stably, and the PLC parent device can be connected to a plurality of PLC sub-devices through the power line, which is convenient to implement unified management and unified control of local devices in some cases.

However, when the PLC sub-device is disconnected from the power line, for example, a device with a battery, such as a smart speaker and the like, can be connected to the network through a router via Wi-Fi at this time.

In some embodiments, the PLC-based network distribution method 10 further includes: sending status change information to the PLC parent device; and/or receiving a control instruction issued by the PLC parent device through the power line, and performing an operation corresponding to the control instruction.

As mentioned above, the PLC parent device can be connected to a plurality of PLC sub-devices through the power line, the PLC parent device can receive a user instruction and send a control instruction to the PLC sub-device through the power line to control the PLC sub-device; the PLC parent device can also store the control instruction, the PLC sub-device can send status change information to the PLC parent device after its own state changes or after executing an instruction, the information can be used to trigger the PLC parent device to send the control instruction to the PLC sub-device, such that the user can control a plurality of PLC sub-devices through one device, and the instructions can be transmitted through the power line, and the local control can still be implemented when the router is disconnected from the network.

Figure 2:
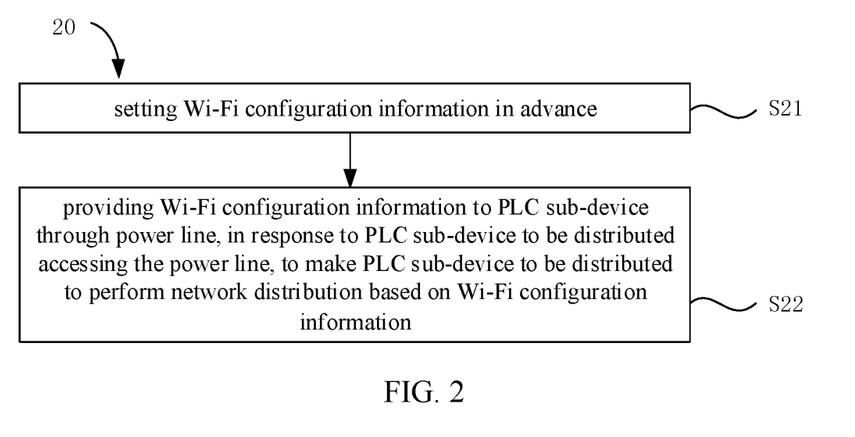
FIG. 2 is a schematic flowchart of another PLC-based network distribution method according to some embodiments.

Various embodiments of the present disclosure also provide another network distribution method, which is applied to the PLC parent device, and in some embodiments, the PLC parent device can be a router device provided with a PLC chip. FIG. 2 shows a schematic flowchart of another PLC-based network distribution method according to some embodiments.

As shown in FIG. 2, the network distribution method 20 includes steps S21-S22:

In step S21, Wi-Fi configuration information is set in advance.

As mentioned above, the PLC parent device has a PLC module and stores the Wi-Fi information, and the PLC parent device can be a router or other central device capable of spreading the Wi-Fi information to the power line by setting in advance.

In step S22, providing the Wi-Fi configuration information to a PLC sub-device through a power line, in response to the PLC sub-device to be distributed accessing the power line, to make the PLC sub-device to be distributed to perform network distribution based on the Wi-Fi configuration information.

The PLC parent device is connected to the power line, and after the PLC sub-device to be distributed accesses the power line, the Wi-Fi configuration information is converted into a carrier signal by the PLC module of the PLC parent device, through the power line, and the Wi-Fi configuration information is sent to the PLC sub-device through the power line, so as to complete the network distribution.

In some embodiments, the network distribution method 20 can further include: connecting the PLC sub-device with the external network by using the PLC parent device as a bridge through the power line, so that the PLC sub-device is connected to the external network through the PLC parent device.

In these embodiments, the PLC parent device can be used as a bridge to connect the PLC sub-device with the external network through the power line, if the PLC parent device is a router, the PLC module of the PLC parent device itself communicates with the PLC module of the PLC sub-device, through the power line, in the form of a carrier signal, to implement data transmission between the PLC sub-device and the external network; and if the PLC parent device is not a router, the PLC sub-device implements the connection to the external network through the power line and the PLC parent device, while the PLC parent device is used as a bridge to connect the PLC sub-device with the router.

In some embodiments, the network distribution method 20 further includes: storing in advance control logic information between at least two PLC sub-devices; determining a second PLC sub-device and a control instruction that triggers a second default behavior of the second PLC sub-device based on the control logic information, in response to a first default behavior occurring in a first PLC sub-device; and sending the control instruction to the second PLC sub-device through the power line, to trigger the second PLC sub-device to perform the second default behavior.

In these embodiments, the PLC parent device can be connected to one or more PLC sub-devices through the power line, and can store in advance the control logic information between at least two PLC sub-devices, and after the first default behavior occurs in the first PLC sub-device, the PLC parent device can be informed through the power line, the PLC parent device is triggered based on the control logic information, a corresponding control instruction can be sent to the second PLC sub-device through the power line. In some situations, the control logic information can include a plurality of PLC sub-devices, corresponding default behaviors and control instructions triggered by the default behaviors, so as to implement automatic settings. Through the power line connection, it can be ensured that even when the router is disconnected from the network, the connected one or more local PLC sub-devices can be controlled conveniently and uniformly.

Figure 3:
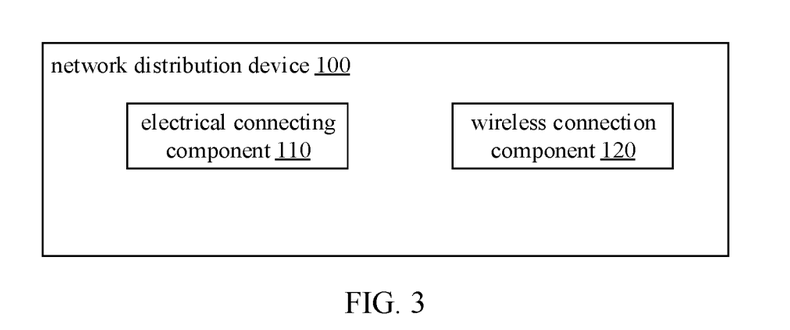
FIG. 3 is a schematic block diagram of a PLC-based network distribution apparatus according to some embodiments.

FIG. 3 shows a network distribution apparatus 100 applied to the PLC sub-device, and as shown in FIG. 3, the network distribution apparatus 100 includes: an electrical connecting component 110 configured to acquire Wi-Fi configuration information from a PLC parent device through a power line, in response to the PLC sub-device to be distributed accessing the power line; and a wireless connecting component 120 configured to perform Wi-Fi configuration on the PLC sub-device based on the configuration information.

In some embodiments, the electrical connecting component 110 is configured to: determine a PLC parent device in a power circuit where the PLC sub-device is located, in response to the PLC sub-device to be distributed accessing a power line; send a Wi-Fi configuration information acquisition request to the PLC parent device; and receive Wi-Fi configuration information returned by the PLC parent device; or receive broadcast information sent from a PLC parent device in a power circuit where the PLC sub-device is located, in response to the PLC sub-device to be distributed accessing a power line; and acquire Wi-Fi configuration information included in the broadcast information.

In some embodiments, the electrical connecting component 110 is further configured to: connect to an external network by using the PLC parent device as a bridge, through the power line.

Figure 4:
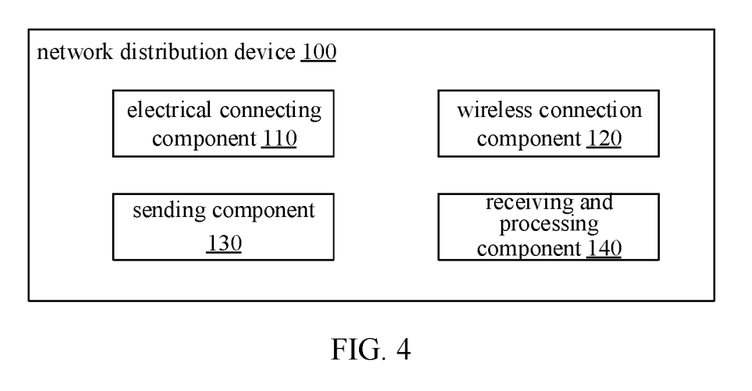
FIG. 4 is a schematic block diagram of another PLC-based network distribution apparatus according to some embodiments.

In some embodiments, as shown in FIG. 4, the network distribution apparatus 100 further includes: a sending component 130 configured to send status change information to the PLC parent device; and/or a receiving and processing component 140 configured to receive a control instruction issued by the PLC parent device through the power line, and perform an operation corresponding to the control instruction.

With respect to the network distribution apparatus 100 in the above embodiments, the implementations for performing operations by individual modules therein have been described in detail in the embodiments regarding the methods, which will not be elaborated herein.

Figure 5:
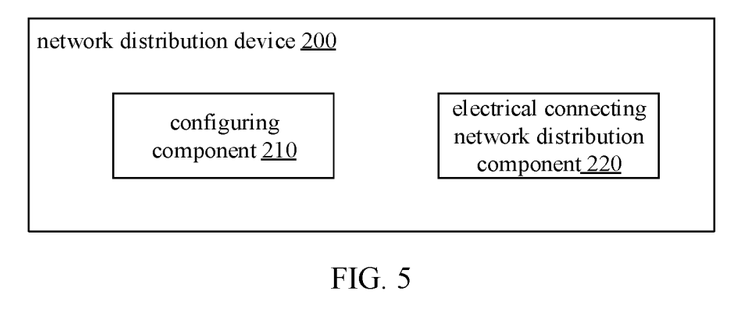
FIG. 5 is a schematic block diagram of another PLC-based network distribution apparatus according to some embodiments.

FIG. 5 shows another network distribution apparatus 200 applied to a PLC parent device, and as shown in FIG. 5, the network distribution apparatus 200 includes: a configuring component 210 configured to set in advance Wi-Fi configuration information; and an electrical connecting network distribution component 220 configured to provide the Wi-Fi configuration information to a PLC sub-device through a power line, in response to the PLC sub-device to be distributed accessing the power line, to make the PLC sub-device to be distributed to perform network distribution based on the Wi-Fi configuration information.

In some embodiments, the electrical connecting distribution component 220 is further configured to: connect the PLC sub-device with an external network by using the PLC parent device as a bridge through the power line, so that the PLC sub-device is connected to an external network through the PLC parent device.

Figure 6:
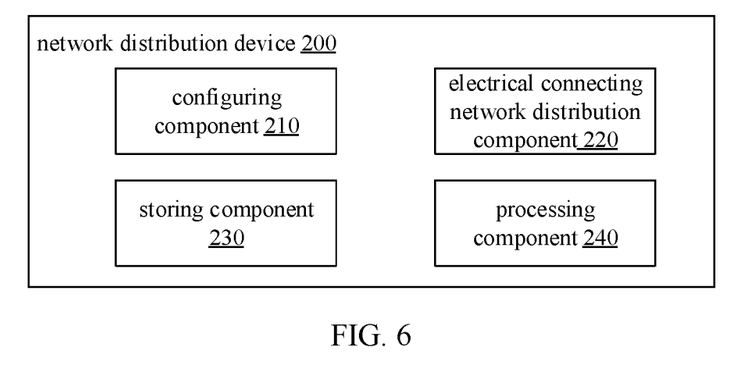
FIG. 6 is a schematic block diagram of another PLC-based network distribution apparatus according to some embodiments.

In some embodiments, as shown in FIG. 6, the network distribution apparatus 200 further includes: a storing component 230 configured to store in advance control logic information between at least two PLC sub-devices; a processing component 240 configured to determine a second PLC sub-device and a control instruction that triggers a second default behavior of the second PLC sub-device based on the control logic information, in response to a first default behavior occurring in a first PLC sub-device; and the electrical connecting network distribution component 220 is further configured to send the control instruction to the second PLC sub-device through the power line to trigger the second PLC sub-device to perform the second default behavior.

In some embodiments, the PLC parent device is a router device provided with a PLC chip.

With respect to the network distribution apparatus 200 in the above embodiments, the implementations for performing operations by individual modules therein have been described in detail in the embodiments regarding the methods, which will not be elaborated herein.

Figure 7:
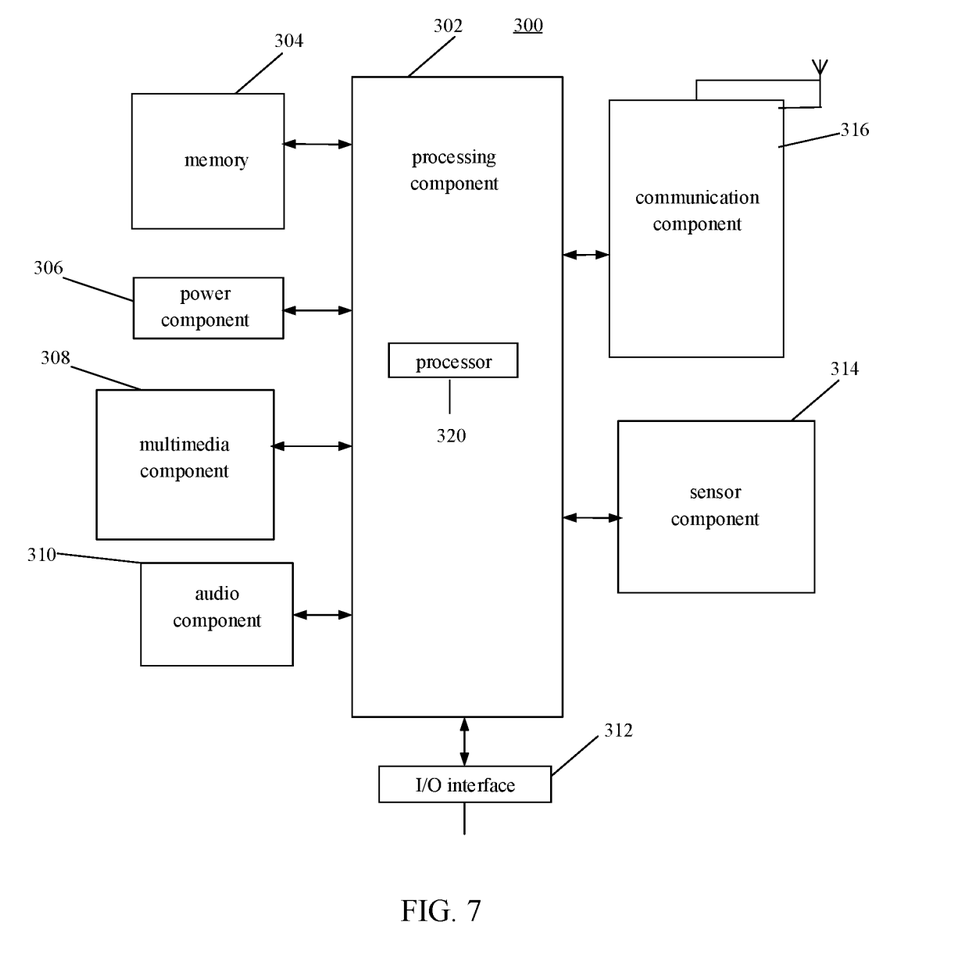
FIG. 7 is a schematic block diagram of an apparatus according to some embodiments.

FIG. 7 is a schematic block diagram of an apparatus of any one of the foregoing embodiments according to some embodiments. For example, the apparatus 300 can be a mobile phone, a computer, a digital broadcast terminal, a messaging device, a gaming console, a tablet, a medical device, fitness equipment, a personal digital assistant, and the like.

Referring to FIG. 7, the apparatus 300 can include one or more of the following components: a processing component 302, a memory device 304, a power component 306, a multimedia component 308, an audio component 310, an input/output (I/O) interface 312, a sensor component 314, and a communication component 316.

The processing component 302 typically controls overall operations of the apparatus 300, such as the operations associated with display, telephone calls, data communications, camera operations, and recording operations. The processing component 302 can include one or more processors 320 to execute instructions to implement all or part of the steps in the above described methods. Moreover, the processing component 302 can include one or more modules which facilitate the interaction between the processing component 302 and other components. For instance, the processing component 302 can include a multimedia module to facilitate the interaction between the multimedia component 308 and the processing component 302.

The memory 304 is configured to store various types of data to support the operation of the apparatus 300. Examples of such data include instructions for any applications or methods operated on the apparatus 300, contact data, phonebook data, messages, pictures, videos, etc. The memory 304 can be implemented by using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 supplies power to various components of the apparatus 300. The power component 306 can include a power management system, one or more power sources, and any other components associated with the generation, management, and distribution of power in the apparatus 300.

The multimedia component 308 includes a screen providing an output interface between the apparatus 300 and a user. In some embodiments, the screen can include a liquid crystal display (LCD) and a touch panel (TP). In some embodiments, an organic light-emitting diode (OLED) can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 308 includes a front camera and/or a rear camera. The front camera and/or the rear camera can receive external multimedia data while the apparatus 300 is in an operation mode, such as a photographing mode or a video mode. Each of the front camera and the rear camera can be a fixed optical lens system or have focus and optical zoom capability.

The audio component 310 is configured to output and/or input audio signals. For example, the audio component 310 includes a microphone ("MIC") configured to receive an external audio signal when the apparatus 300 is in an operation mode, such as a call mode, a recording mode, and a voice recognition mode. The received audio signal can be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons can include, but are not limited to, a home button, a volume button, a starting button, and a locking button.

The sensor component 314 includes one or more sensors to provide status assessments of various aspects of the apparatus 300. For instance, the sensor component 314 can detect an on/off status of the apparatus 300, relative positioning of components, e.g., the display and a keypad, of the apparatus 300, the sensor component 314 can also detect a change in position of the apparatus 300 or one component of the apparatus 300, a presence or absence of user contact with the apparatus 300, an orientation or an acceleration/deceleration of the apparatus 300, and a change in temperature of the apparatus 300. The sensor component 314 can include a proximity sensor configured to detect the presence of nearby objects without any physical contact. The sensor component 314 can also include a light sensor, such as a CMOS or CCD image sensor, for use in imaging applications. In some embodiments, the sensor component 314 can also include an accelerometer sensor, a gyroscope sensor, a magnetic sensor, a pressure sensor, or a temperature sensor.

The communication component 316 is configured to facilitate wired or wireless communication between the apparatus 300 and other devices. The apparatus 300 can access a wireless network based on a communication standard, such as Wi-Fi, 2G, 3G, 4G, or 5G, or a combination thereof. In one embodiment, the communication component 316 receives a broadcast signal or broadcast associated information from an external broadcast management system via a broadcast channel.

In some embodiments, the communication component 316 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the apparatus 300 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as the memory 304 including the instructions executable by the processor 320 in the apparatus 300, for performing the above-described methods. For example, the computer-readable storage medium can be a ROM, a random access memory (RAM), a CD-ROM, a magnetic tape, a floppy disc, an optical data storage apparatus, and the like.

Figure 8:
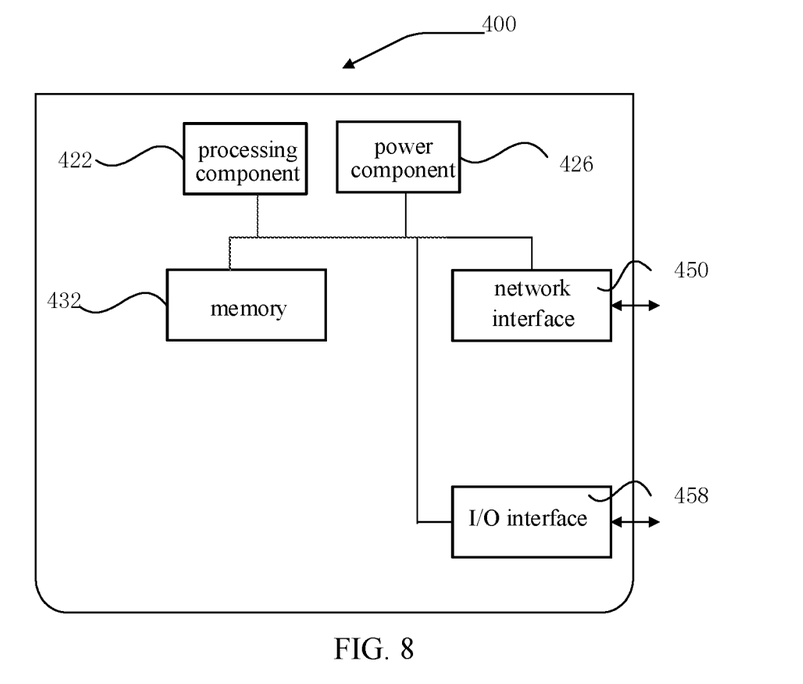
FIG. 8 is a schematic block diagram of an electronic apparatus according to some embodiments.

FIG. 8 is a block diagram of an electronic device 400 according to some embodiments. For example, the electronic device 400 can be provided as a server. Referring to FIG. 8, the electronic device 400 includes a processing component 422, which further includes one or more processors, and memory resources represented by a memory 432, for storing instructions executable by the processing component 422, such as application programs. The application program stored in the memory 432 can include one or more modules each corresponding to a set of instructions. In addition, the processing component 422 is configured to execute instructions to perform the above method.

The electronic device 400 can also include a power component 426 configured to perform power management of the electronic device 400, a wired or wireless network interface 450 configured to connect the electronic device 400 to the network, and an input/output (I/O) interface 458. The electronic device 400 can perform an operation based on an operating system stored in the memory 432, such as Windows Server™, Mac OS X™, Unix™, Linux™, FreeBSD™, or the like.

Various embodiments of the present disclosure can include one or more of the following advantages.

By connecting the power line, the PLC parent device sends the Wi-Fi configuration information to the PLC sub-device to be distributed, and the PLC sub-device performs network distribution based on the Wi-Fi configuration information and the router, thereby simplifying the network distribution process of the smart devices, the user only needs to electrically connect the PLC sub-device to be distributed to the power line through the socket to implement the network distribution process, which is convenient and efficient.

In some embodiments, the socket can be replaced with a wireless electrical power coupler, such as a wireless charger.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A network distribution method, applied to a Power Line Communication (PLC) sub-device, comprising:
    acquiring Wi-Fi configuration information from a PLC parent device through a power line in response to the PLC sub-device to be distributed accessing the power line; and
    performing Wi-Fi configuration on the PLC sub-device based on the Wi-Fi configuration information,
    wherein the method further comprises:
    sending status change information to the PLC parent device; and
    receiving a control instruction issued by the PLC parent device through the power line, and performing an operation corresponding to the control instruction,
    wherein the control instruction is a user instruction received by the PLC parent device to implement control operations of the PLC sub-device by the user through the PLC parent device.

2. The network distribution method according to claim 1, wherein the acquiring Wi-Fi configuration information from a PLC parent device through a power line in response to the PLC sub-device to be distributed accessing the power line comprises one of:
    determining the PLC parent device in a power circuit where the PLC sub-device is located in response to the PLC sub-device to be distributed accessing a power line; sending a Wi-Fi configuration information acquisition request to the PLC parent device; and receiving Wi-Fi configuration information returned by the PLC parent device; and
    receiving broadcast information sent from a PLC parent device in a power circuit where the PLC sub-device is located in response to the PLC sub-device to be distributed accessing a power line; and acquiring Wi-Fi configuration information included in the broadcast information.

3. The network distribution method according to claim 1, further comprising:
    connecting to an external network by using the PLC parent device as a bridge through the power line.

4. A network distribution method, applied to a Power Line Communication (PLC) parent device, the method comprising:
    setting in advance Wi-Fi configuration information;
    providing the Wi-Fi configuration information to a plurality of PLC sub-devices to be distributed through a power line, in response to the plurality of PLC sub-devices to be distributed accessing the power line, to make the plurality of PLC sub-devices to be distributed to perform network distribution based on the Wi-Fi configuration information;
    connecting the plurality of PLC sub-devices with an external network by using the PLC parent device as a bridge through the power line, to make the plurality of PLC sub-devices connected to the external network through the PLC parent device;
    storing in advance control logic information between a first PLC sub-device and a second PLC sub-device among the plurality of PLC sub-devices;
    determining the second PLC sub-device and a control instruction that triggers a second default behavior of the second PLC sub-device based on the control logic information in response to a first default behavior occurring in the first PLC sub-device; and
    sending the control instruction to the second PLC sub-device through the power line to trigger the second PLC sub-device to perform the second default behavior,
    wherein the control instruction is a user instruction received by the PLC parent device to implement control operations of the plurality of PLC sub-devices by the user through the PLC parent device.

5. The network distribution method according to claim 4, wherein the PLC parent device is a router device provided with a PLC chip.

6. A network distribution apparatus, applied to a Power Line Communication (PLC) sub-device, comprising:
    memory storing instructions; and
    a processor configured to:
    acquire Wi-Fi configuration information from a PLC parent device through a power line, in response to the PLC sub-device to be distributed accessing the power line; and
    perform Wi-Fi configuration on the PLC sub-device based on the configuration information,
    wherein the processor is further configured to perform:
    sending status change information to the PLC parent device; and
    receiving a control instruction issued by the PLC parent device through the power line, and perform an operation corresponding to the control instruction,
    wherein the control instruction is a user instruction received by the PLC parent device to implement control operations of the PLC sub-device by the user through the PLC parent device.

7. The network distribution apparatus according to claim 6, wherein the processor is further configured to perform one of:
    determining a PLC parent device in a power circuit where the PLC sub-device is located in response to the PLC sub-device to be distributed accessing a power line; send a Wi-Fi configuration information acquisition request to the PLC parent device; and receive Wi-Fi configuration information returned by the PLC parent device; and receiving broadcast information sent from a PLC parent device in a power circuit where the PLC sub-device is located in response to the PLC sub-device to be distributed accessing a power line; and acquire Wi-Fi configuration information included in the broadcast information.

8. The network distribution apparatus according to claim 6, wherein the processor is further configured to:

connect to an external network by using the PLC parent device as a bridge through the power line.

9. A network distribution apparatus implementing the network distribution method according to claim 4, comprising:

memory storing instructions; and a processor configured to invoke instructions stored in the memory to execute operations of the network distribution method.

10. The network distribution apparatus according to claim 9, wherein the PLC parent device is a router device provided with a PLC chip.

11. A non-transitory computer-readable storage medium having instructions stored thereon for execution by a processing circuit to implement operations of the network distribution method according to claim 1.

12. A smart home system implementing the network distribution method according to claim 1, comprising a plurality of smart devices including the PLC sub-device and a router, wherein:

the PLC parent device is configured to send the Wi-Fi configuration information to the PLC sub-device to be distributed, and the PLC sub-device is configured to perform network distribution based on the Wi-Fi configuration information through the router.

13. The smart home system of claim 12, wherein PLC sub-device is configured to automatically realize network distribution upon being electrically coupled to the power line through an electrical power coupler.

* * * * *